Dec. 29, 1942.   C. W. SEWELL   2,306,643
SYNCHRONIZED CLUTCH MECHANISM
Filed Nov. 28, 1939   3 Sheets-Sheet 2

Inventor
C. W. Sewell
by Mawhinney & Mawhinney
Attorneys.

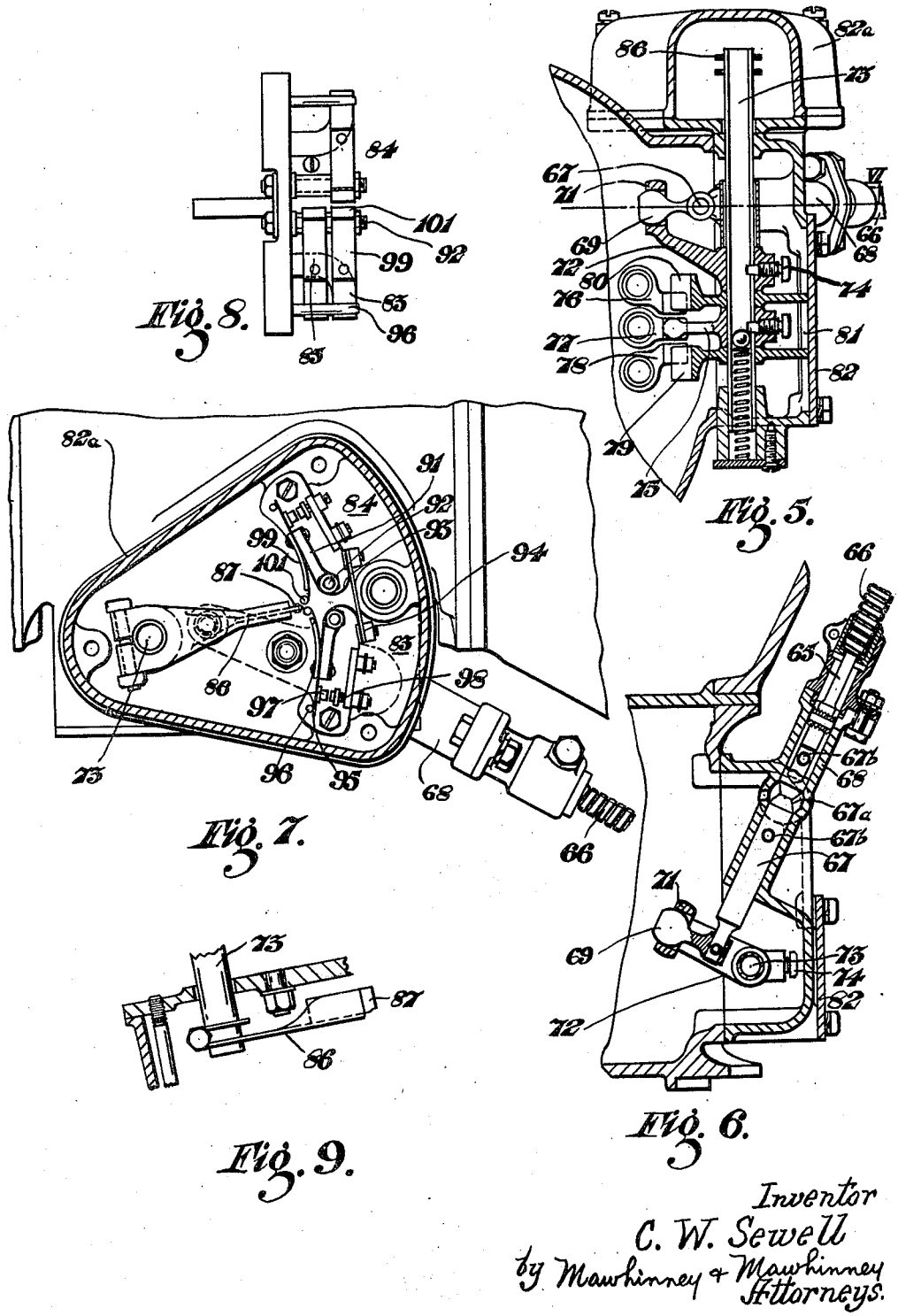

Patented Dec. 29, 1942

2,306,643

UNITED STATES PATENT OFFICE 2,306,643

SYNCHRONIZED CLUTCH MECHANISM

Charles William Sewell, Staines, England, assignor to Lagonda Motors Limited, Staines, Middlesex, England Application November 28, 1939, Serial No. 306,571
In Great Britain January 9, 1939

6 Claims. (Cl. 192—53)

This invention relates to a layshaft change-speed gearing, particularly for use in the drive of a motor-vehicle, of the kind in which one of the "speeds" can be introduced by the sliding of a positive clutch element into engagement with a coacting positive clutch element.

It is known at the present time to incorporate a synchronizing device in such a mechanism, such synchronizing device usually comprising coacting male and female conical friction surfaces one of which is axially fast while the other is axially slidable, whilst a baulking means is provided for preventing engagement from taking place between the positive clutch elements until synchronism has been reached.

It is one object of the present invention to provide a simple form of synchronizing device with which a very light effort will suffice for introducing the "speed" with which the device is associated.

It is a further object to provide a compact device by means of which adjacent coaxial gears (between which the device is disposed) can be placed more closely together than with present forms of synchronizing device, thus making for a compact, rigid change-speed gearing.

According to the invention, an electro-magnetic clutching means is operable for synchronizing the positive clutch elements before they are engaged with one another. Preferably the slidable positive clutch element has a sliding and driving connection with part of the electro-magnetic clutching means whereby the engagement of the positive clutch elements is frictionally resisted until synchronization has taken place.

In the accompanying drawings:

Figure 5 is a sectional elevation of part of one form of operating mechanism for the gearing of Figures 2–4;

Figure 6 is a cross-section taken on the line VI—VI of Figure 5; and

Figures 7 to 9 are three detail views at right-angles to one another of a preferred form of switch for use therewith.

Figure 1:
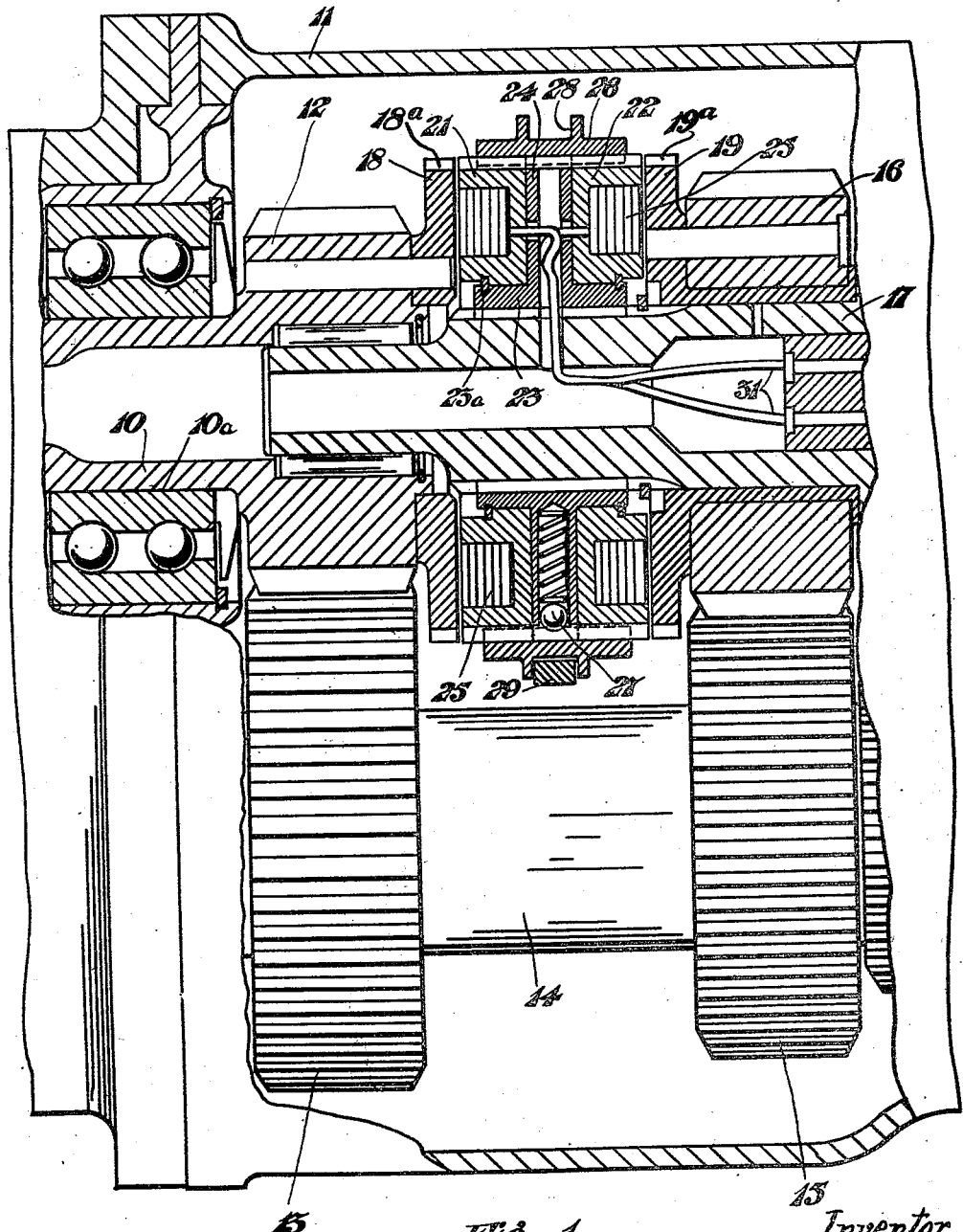
Figure 1 is a fragmentary sectional elevation showing diagrammatically how the invention could be applied to the top (direct drive) and next "speed" of a layshaft type of gear-box.

In the construction of Figure 1, 10 represents the tail end of a driving shaft journalled in bearings 10a in a gear casing 11. Fast on the driving shaft is a gear 12 in permanent mesh with a gear 13 fast on a layshaft 14. 15 is a gear fast on the layshaft and in permanent mesh with a gear 16 free on a driven shaft 17.

A double-acting slidable device is mounted as usual on the driven shaft between two externally-toothed dog clutch elements 18, 19 of magnetic material. One of these (18) is fast with the driving shaft and the other (19) is free upon the driven shaft, being fast with the free gear 16 thereon. On the peripheries of dog clutch elements 18 and 19 in Figure 1 are formed a ring of dog teeth 18a and 19a, respectively. This device includes a carrier for two electro-magnets 21, 22 which are adapted to coact, respectively, with the adjacent flat radial faces of the dog clutch elements aforesaid. The carrier comprises a hub portion 23 slidably splined upon the driven shaft, and a central radially-extending flange portion 24 against which the two electro-magnets 21, 22 rest, being rotatably mounted thereon and endwise held by circlips 23a. Each of the electro-magnets comprises an outwardly-facing, channel-section annulus of magnetic material with an appropriate coil 25 disposed in the interior thereof.

The outer periphery of the flange portion 24 of the carrier has a sliding and driving engagement with a slidable, double-ended, dog clutch sleeve 26 which in its extreme positions can engage with one or other of the dog clutch elements 18, 19. The dog clutch sleeve also has a sliding and driving engagement with the two electro-magnets 21, 22, thus restricting them from rotating on the carrier.

In addition, a spring-loaded ball 27 mounted in the carrier serves for centralizing the carrier with respect to the dog clutch sleeve, and the latter has a peripheral groove 28 engaged by a striking fork 29. Current for the two coils can be brought along leads 31 provided in the interior of the driven shaft, the leads emerging through a radial hole therein into the interior of the flange of the carrier, whence they are connected to the respective coils.

Assuming that the parts of the mechanism are in the neutral position shown, movement of the change-speed lever in a direction to introduce, say, top "speed," causes the operation of appropriate switch contacts (described in connection with Figures 2 to 9) whereby a circuit for the associated coil 25 is closed, whilst at the same time the dog clutch sleeve and synchronizing device are moved slightly in the appropriate direction as a whole—to the left in Figure 1 for top "speed." The electro-magnetic attraction resulting from the energization of the coil tends to cause the electro-magnet 21 to revolve in synchronism with the adjacent dog clutch 18. The electro-magnet 21 is freely rotatable on the carrier 23, 24, as stated, but the carrier is slidingly splined on the driven shaft and both the carrier and the electro-magnet 21 have a sliding and driving connection with the dog clutch 26. Consequently, until synchronism has been reached, the tendency for the electro-magnet to rotate in unison with the adjacent dog clutch element 18, i. e., at a different speed from that of the driven shaft and of the carrier 23, 24, causes frictional binding to be developed in the sliding and driving connection of the dog clutch sleeve 26 with the carrier and electro-magnet, and this frictional resistance is operative for discouraging sliding movement of the dog clutch sleeve until synchronization has been reached. Thereupon the further axial movement of the dog clutch sleeve can take place relatively freely; and before engagement between the dog clutch elements occurs the circuit is preferably broken at the said contacts, thus allowing the actual engagement of the dogs to take place freely.

The contacts are arranged so that, when changing down from top "speed," the movement of the dog clutch sleeve into the neutral position does not complete a circuit for either coil 25. The operation of moving from neutral to the "speed" below top "speed" is similar in all respects to that described.

Figure 2:
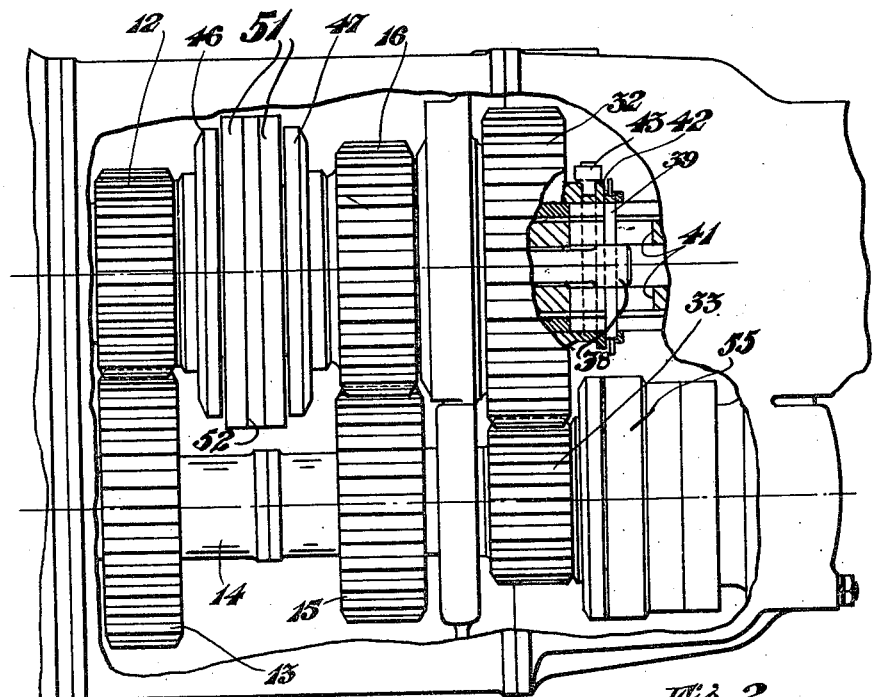
Figure 2 is an elevation, to a smaller scale, of a preferred form of gear-box, arranged to give three forward "speeds," according to the invention.
Figures 3, 4:
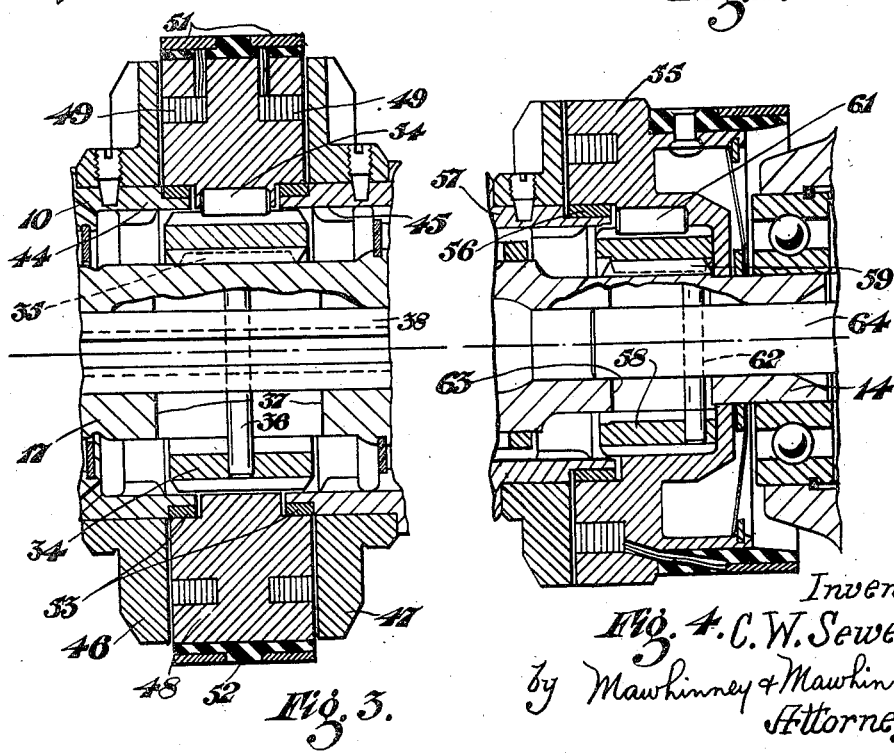
Figure 3 is a sectional elevation, to a larger scale, of the device of Figure 2 for introducing third "speed" (direct drive) and second "speed"
Figure 4 is a sectional elevation, also to the larger scale, of the device of Figure 2 for introducing first "speed"

In the construction shown by Figures 2 to 9, 10 again represents a driving shaft, 12 a gear fast thereon and in permanent mesh with a gear 13 fast on a layshaft 14, and 15 is a gear fast on the layshaft and in permanent mesh with a gear 16 free on the driven shaft 17. Figure 2, in addition, shows a gear 32 fast on the driven shaft and in permanent mesh with a gear 33 free on the layshaft for first "speed." Moreover, in each case, the synchronizing device includes an electro-magnetic clutching means disposed exteriorly of the slidable dog clutch element. Thus, the synchronizing device for introducing top or second "speed" includes a slidable dog clutch element 34 which is slidably splined at 35 upon the driven shaft and internally engaged by a cross pin 36 working in longitudinal slots 37 in the driven shaft. The cross pin is engaged by a rod 38 disposed in the interior of the shaft and carrying a cross pin 39 which works in slots 41 in the shaft and is connected externally of the shaft to a grooved ring 42 engaged with a striker fork 43. In the present instance the dog clutch elements 44, 45, which are fast with the gears 12 and 16, respectively, are formed integrally therewith, and secured thereto are flanges 46, 47 of magnetic material for coacting with the interposed electro-magnetic member 48 having in its interior the two exciting coils 49.

Current for the coils can be brought in by slip rings 51 which are respectively connected to the coils, the other ends of the latter being earthed to the electro-magnetic member 48 which should be formed of a material having a small residual magnetism. The slip rings are insulated from the electro-magnet by an insulating ring 52. The electro-magnetic ring 48 is freely journalled and slidably mounted on bronze rings 53 mounted on the positive clutch elements 44, 45. In addition, the electro-magnetic member 48 has a frictional sliding and driving connection with the slidable dog clutch element, which connection is indicated diagrammatically at 54.

Numeral 54 indicates one of a number of rollers, each rollers being arranged substantially longitudinally between the adjacent surfaces as a key. Thus the roller shown is carried by the electro-magnet 48 and is engaged between a pair of splines on the slidable positive clutch element 34. It is found in practice that the frictional resistance developed in this construction may in some cases be unnecessarily great and in other cases insufficient. By the use of sliding keys in the form of rollers such as 54 and 61 a greater choice is had in the provision of a suitable frictional resistance. Instead of the rollers 54 and 61 ordinary sliding splines may be used.

In the case of first "speed" the parts are arranged in a substantially similar manner, except that here the electro-magnetic member 55 is a single-acting one journalled partly on a bronze ring 56 carried at one side of clutch element 58 by the positive clutch element 57 which is fast with the gear 33 and, on the other side of the slidable positive clutch element 58, on the layshaft. The slidable positive clutch element, which is slidingly splined at 59 on the layshaft and has a frictional connection 61 with the electro-magnetic member 55, has a cross pin 62 working in slots 63 in the layshaft and connected by a rod 64 leading to the end of the layshaft where it can be actuated by an appropriate mechanism.

It is believed that the manner in which first, second or third "speed" can be introduced, on the sliding of the appropriate dog clutch element, will readily be understood from the description given in connection with Figure 1. For the manner in which the slidable dog clutch elements may be actuated attention may be directed to the following description, in which reference is made to Figures 5 to 9.

Figures 5 and 6 show one end of a flexible actuating shaft 65 disposed in a flexible casing 66, the shaft end being connected to a rod 67 which is slidably and rotatively mounted in a casing 68. The rod has a groove 67a and holes 67b to coact with a spring-pressed locating plunger in known manner. The manner in which the other end of the flexible shaft 65 is connected to be operated by the gearshift means such that the rod 67 may be slid axially or rotated forms no part of the present invention but will readily be apparent to those skilled in the art.

Fast on the inner end of the rod 67 is an arm 69 terminating with a ball portion which is engaged in an eye 71 on an arm 72 secured on a rod 73 by a dowel pin 74. Fast on the rod 73 is an arm 75. 76, 77 and 78 represent selector forks, 76 being that for third and second "speed," 77 that for first "speed" and 78 that for the reverse drive. Thus, the selector fork 76 is connected in any convenient manner with the striker fork 43, and the selector fork 77 with the rod 64. The reverse drive gearing, which may be of any ordinary kind, is not shown for the sake of simplicity.

The selector forks are aligned with one another in a usual manner to coact with the arm 75. Figure 5 shows the arm engaged with the selector fork 77. If the rod 67 be rotated, due to the engagement of the arm 69 with the arm 71 the rod 73 will be correspondingly raised or lowered, according to the direction of rotation of the rod 67, to bring the arm 75 into engagement with one or other of the other selector forks 76, 78. On the other hand, if the rod 67 be pulled or pushed the rod 73 will be rotated, thus causing axial movement of whichever selector fork is engaged by the arm 75.

In order to prevent movement of any selector fork while it is not engaged by the arm 75, use is made of dogs 79, 80 which are freely mounted though endwise held upon the rod 73 and have a sliding keyed connection at 81 with the stationary casing 82. The drawing shows the dogs respectively engaged with the selector forks 76, 78. Movement of the rod 73 upwardly from the position shown will cause the lower dog 79 to coact with both the selector forks 77, 78. Movement of the rod 73 downwardly will bring the upper dog 80 into active co-operation with both the selector forks 76, 77.

The switch in this instance, which is disposed in the casing 82a, comprises two oppositely-disposed switching mechanisms 83, 84 for third and second "speeds," respectively, and another switch mechanism 85 for first "speed" arranged alongside the switch mechanism 83, and a single actuating member 86 is provided for all the switch mechanisms. This includes a V-ended insulating block 87 on a trip which is secured to the upper end of the rod 73.

Each switching mechanism includes a rocker 91 pivotally mounted on a pin 92, a spring blade 93 being secured to the rocker and at one end 94 to a stationary part, whilst its free end 95 engages a stop pin 96. The free end carries a contact 97 which can co-operate with an adjustable stationary contact 98. Also secured to the rocker is a curved guide 99, and between the guide and the rocker is secured a spring blade terminating with an eye 101. The eye 101 lies in proximity to the V-end of the insulating block of the actuating member 86 when this is in the appropriate coacting position—see, for example, Figure 7.

It will now be observed that rotation of the actuating member 86 in one direction will cause the V-end of the block to engage the adjacent eye, thus turning the rocker about its fulcrum pin and closing the contacts 97, 98. This completes a circuit for the appropriate coil. Further movement of the actuating member, which is fast on the rod 73, is thereupon prevented by the frictional engagement between the electro-magnet and the slidable dog clutch element, which prevents movement of the latter until synchronism has been reached. On synchronism being reached, however, the actuating member 86 can be rotated further in the same direction, over dead centre, and on passing the eye the rocker moves to open the switch contacts under the bias of the spring 93, thus de-energizing the previously-excited coil. Thereupon the slidable dog clutch sleeve can be moved fully in the appropriate direction to engage the coacting dog clutch element.

Movement of the actuating member 86 in the other direction, on the rotation of the rod 73, will bring the V-end of the actuating member against the adjacent side of the eye. Such engagement pulls upon the eye relatively to the rocker fulcrum in a manner to maintain the switch contacts open. Thus, the actuating member 86 can be returned to the neutral position without the switch contacts becoming closed.

It will be obvious that axial movement of the shaft 73, to bring the arm 75 out of engagement with the selector fork 77 and into engagement with the selector fork 76, will move the actuating member from a position adjacent the switch mechanism 85 into the position shown in Figure 7 in which the actuating member is disposed substantially between the two eyes of the switch mechanisms 83, 84, and vice versa.

With an arrangement according to the invention the dog clutch elements, which are respectively fast with the driving shaft and free on the driven shaft, in the case of the top and next "speed," can be placed more closely together than in the case of a normal type of synchro-mesh gear-box, thus making for a compact and rigid gearing. Furthermore, the effort required for changing speed is a very light one, and, in consequence, the change-speed lever or the equivalent can be mounted on the steering column or in any other convenient place to be operated by the driver's fingers.

What I claim as my invention and desire to secure by Letters Patent of the United States is:

1. In a layshaft change-speed gearing, a slidable positive clutch element, a coacting positive clutch element, a member of magnetic material fast with the latter clutch element, and an electro-magnet for frictionally coacting with said magnetic member, said electro-magnet having a sliding and driving connection with said slidable positive clutch element which, when the electro-magnet is energized, offers frictional resistance against the sliding of the slidable positive clutch element until synchronism is reached.

2. In a layshaft change-speed gearing, a slidable positive clutch element, a coacting positive clutch element, electro-magnetic clutching means for synchronizing the speeds of said clutch elements before they are engaged, and switching means whereby the electro-magnetic clutching means is energized automatically on the initial movement of the slidable positive clutch element in the engaging direction and de-energized during the final movement thereof when synchronism has been reached.

3. In a layshaft change-speed gearing having a shaft and a member of magnetic material to be clutched thereto, said shaft and member being held against relative axial movement, a positive clutch element fast with said member, a positive clutch element having a sliding and driving connection with said shaft and adapted to engage the first-mentioned positive clutch element, and an electro-magnet having a sliding and driving connection with the second-mentioned positive clutch element and adapted, when energized, to frictionally engage said member, the arrangement being such that the friction between the electro-magnet and the second-mentioned positive clutch element resists the movement of the latter in the engaging direction until synchronism has been reached.

4. In a layshaft change-speed gearing having a shaft and a member of magnetic material to be clutched thereto, said shaft and member being held against relative axial movement, a positive clutch element fast with said member, a positive clutch element having a sliding and driving connection with said shaft and adapted to engage the first-mentioned positive clutch element, and an electro-magnet encircling the second-mentioned positive clutch element and having a sliding and driving connection therewith, said electro-magnet adapted, when energized, to frictionally engage said member, the arrangement being such that the friction between the electro-magnet and said second-mentioned positive clutch element resists the movement of the latter in the engaging direction until synchronism has been reached.

5. In a layshaft change-speed gearing having a shaft and a member of magnetic material to be clutched thereto, said shaft and member being held against relative axial movement, a positive clutch element fast with said member, a positive clutch element slidably splined on said shaft and adapted to engage the first-mentioned positive clutch element, an electro-magnet having a sliding and driving connection with the slidable positive clutch element such that the friction between the electro-magnet and the slidable positive clutch element resists the movement of the latter in the engaging direction until synchronism has been reached, said electro-magnet being adapted, when energized, to frictionally engage said member, and switching means whereby the electro-magnet is energized automatically on the initial movement of the slidable positive clutch element in the engaging direction and de-energized during the final movement thereof when synchronism has been reached.

6. In a layshaft change-speed gearing having a shaft and a member of magnetic material to be clutched thereto, said shaft and member being held against relative axial movement, a ring of dog teeth fast with said member, a clutch element having a sliding splined connection with said shaft and adapted to engage said ring of dog teeth, means disposed in the interior of the shaft for sliding said clutch element, an axially-slidable electro-magnet having a sliding and driving connection with said clutch element such that the friction between the electro-magnet and the clutch element resists the movement of the latter in the engaging direction until synchronism has been reached, said electro-magnet adapted, when energized, to frictionally engage said member, actuating means for said clutch element, and a switch for effecting excitation of said electro-magnet, said switch being automatically actuated only during the initial movement of said actuating means in the clutch-engaging direction.

CHARLES W. SEWELL.